United States Patent [19]

Semmelhaack et al.

[11] 4,007,439
[45] Feb. 8, 1977

[54] SELECT HIGH/LOW REGISTER METHOD AND APPARATUS

[75] Inventors: Carl Frederick Semmelhaack, West Chester; Mark Camillo Divecchio, Phoenixville, both of Pa.

[73] Assignee: Burroughs Corporation, Detroit, Mich.

[22] Filed: Aug. 18, 1975

[21] Appl. No.: 605,251

[52] U.S. Cl. .................................. 340/146.2
[51] Int. Cl.[2] .............................. G06F 7/02
[58] Field of Search ......................... 340/146.2

[56] References Cited

UNITED STATES PATENTS

| | | | |
|---|---|---|---|
| 3,731,765 | 5/1973 | Robaszkiewicz | 340/146.2 X |
| 3,825,895 | 7/1974 | Larsen et al. | 340/146.2 |
| 3,829,664 | 8/1974 | Kashio | 340/146.2 X |

OTHER PUBLICATIONS

K. E. Dimitri, "Dynamic Binary Word Comparator," IBM Technical Disclosure Bulletin, vol. 14, No. 8, Jan., 1972, pp. 2292-2293.

*Primary Examiner*—David H. Malzahn
*Attorney, Agent, or Firm*—K. R. Peterson; E. M. Chung; L. C. Brenner

[57] ABSTRACT

In a large parallel processing environment including a plurality of active registers storing either normalized floating point or integer data a high/low register selection circuit identifies selectively the register or registers storing either the highest or lowest numerical data value. The numerical data in each active register is first converted into a pure binary magnitude pattern having the same relative value as the original numerical data for a select high register search, and the inverse relative value for a select low register search. Thereafter, the binary patterns from all active registers are processed together two bits at a time through an OR network with the OR network output functioning to deactivate all registers having an OR'ed two bit pattern less than the OR network output value. The deactivating process is continued two bits at a time until either only one register remains active or all bits have been processed two bits at a time through the OR network.

11 Claims, 11 Drawing Figures

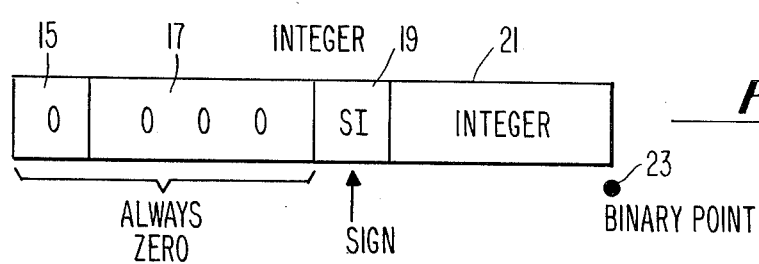
Fig.2A
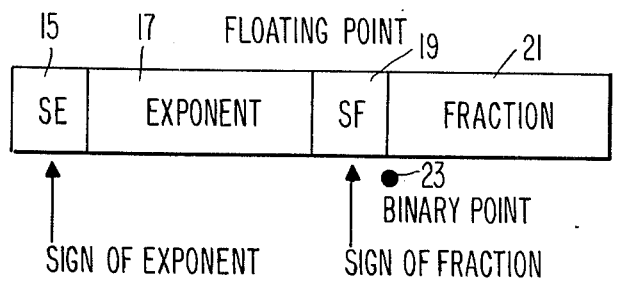
Fig.2B
Fig.2C
| SIGN | MAGNITUDE | INTERPRETATION | | |
|---|---|---|---|---|
| | | INTEGER | EXPONENT | FRACTION |
| 0 | 1 1 1 | +7 | $2^7 = 128$ | +7/8 |
| 0 | 1 1 0 | +6 | $2^6 = 64$ | +3/4 |
| 0 | 1 0 1 | +5 | $2^5 = 32$ | +5/8 |
| 0 | 1 0 0 | +4 | $2^4 = 16$ | +1/2 |
| 0 | 0 1 1 | +3 | $2^3 = 8$ | INVALID |
| 0 | 0 1 0 | +2 | $2^2 = 4$ | INVALID |
| 0 | 0 0 1 | +1 | $2^1 = 2$ | INVALID |
| 0 | 0 0 0 | +0 | $2^0 = 1$ | 0 |
| 1 | 1 1 1 | −1 | $2^{-1} = 1/2$ | INVALID |
| 1 | 1 1 0 | −2 | $2^{-2} = 1/4$ | INVALID |
| 1 | 1 0 1 | −3 | $2^{-3} = 1/8$ | INVALID |
| 1 | 1 0 0 | −4 | $2^{-4} = 1/16$ | INVALID |
| 1 | 0 1 1 | −5 | $2^{-5} = 1/32$ | −5/8 |
| 1 | 0 1 0 | −6 | $2^{-6} = 1/64$ | −3/4 |
| 1 | 0 0 1 | −7 | $2^{-7} = 1/128$ | −7/8 |
| 1 | 0 0 0 | −8 | $2^{-8} = 1/256$ | −1 |

Fig.5

| D | E | A | B | C |
|---|---|---|---|---|
| 0 | 0 | 0 | 0 | 0 |
| 0 | 1 | 0 | 0 | 1 |
| 1 | 0 | 0 | 1 | 0 |
| 1 | 1 | 1 | 0 | 0 |

Fig.6

| D | E | A | B | C | X | Y | Z | RESET |
|---|---|---|---|---|---|---|---|---|
| 0 | 0 | 0 | 0 | 0 | 0 | 0 | 0 | 0 |
| 0 | 0 | 0 | 0 | 0 | 0 | 0 | 1 | 1 |
| 0 | 0 | 0 | 0 | 0 | 0 | 1 | 0 | 1 |
| 0 | 0 | 0 | 0 | 0 | 0 | 1 | 1 | 1 |
| 0 | 0 | 0 | 0 | 0 | 1 | 0 | 0 | 1 |
| 0 | 0 | 0 | 0 | 0 | 1 | 0 | 1 | 1 |
| 0 | 0 | 0 | 0 | 0 | 1 | 1 | 0 | 1 |
| 0 | 0 | 0 | 0 | 0 | 1 | 1 | 1 | 1 |
| 0 | 1 | 0 | 0 | 1 | 0 | 0 | 1 | 0 |
| 0 | 1 | 0 | 0 | 1 | 0 | 1 | 1 | 1 |
| 0 | 1 | 0 | 0 | 1 | 1 | 0 | 1 | 1 |
| 0 | 1 | 0 | 0 | 1 | 1 | 1 | 1 | 1 |
| 1 | 0 | 0 | 1 | 0 | 0 | 1 | 0 | 0 |
| 1 | 0 | 0 | 1 | 0 | 0 | 1 | 1 | 0 |
| 1 | 0 | 0 | 1 | 0 | 1 | 1 | 0 | 1 |
| 1 | 0 | 0 | 1 | 0 | 1 | 1 | 1 | 1 |
| 1 | 1 | 1 | 0 | 0 | 1 | 0 | 0 | 0 |
| 1 | 1 | 1 | 0 | 0 | 1 | 0 | 1 | 0 |
| 1 | 1 | 1 | 0 | 0 | 1 | 1 | 0 | 0 |
| 1 | 1 | 1 | 0 | 0 | 1 | 1 | 1 | 0 |

SELECT HIGH/LOW REGISTER METHOD AND APPARATUS

BACKGROUND OF THE INVENTION

As speed requirements of computer systems have increased, systems employing greater numbers of parallel processors have been developed. One such system, has in the order of 64 parallel processors, see U.S. Pat. No. 3,537,074, issued Oct. 27, 1970 to R. A. Stokes et al., and assigned to the assignee of the present invention.

Present day large computer systems incorporating a high degree of parallelism often include a plurality of widely scattered registers. When data in these registers are to be compared, the propagation delays involved in transmitting data from each register to a central comparator and back consumes precious processing time and limits the overall throughput of the system.

Certain calculations in large parallel computer systems require the determination of which register(s) in a plurality of scattered registers are storing either the highest or lowest value numerical data. Bit-by-bit comparison of the data in the registers involves long propagation delays due to the repetitive cycling of data over long data paths. Conversely, comparison in parallel of the data in the registers is prohibitively expensive and complex due to the increased amount of logic and cabling required.

Therefore, it is an object of the present invention to provide an improved method and apparatus for determining selectively the register or registers storing either the highest or lowest value of numerical data in a plurality of widely scattered registers.

It is another object of the invention to minimize both propagation delay and circuit complexity in a system for determining selectively the register or registers storing either the highest or lowest value of numerical data in a plurality of registers.

SUMMARY OF THE INVENTION

The above and other objects of the invention are realized by converting the normalized floating point or integer numerical data stored in a plurality of active registers into pure binary magnitude patterns having the same relative values as the numerical data for a high register search and inverse relative values for a low register search. Thereafter, the binary patterns are processed 2 bits at a time through a central OR network. The OR network output is fed back to the registers to inactivate all registers having a converted binary magnitude pattern lower in value than the OR output value. The deactivating process is continued two bits at a time until either only one register remains active or until all converted binary magnitude pattern bits have been processed together two bits at a time through the OR network.

The system configuration and operational details given above have been presented in simplified form. Other features of the invention will become more fully apparent in the drawings and detailed description presented hereinafter.

BRIEF DESCRIPTION OF THE DRAWINGS

FIG. 2A presents the integer format used in the preferred embodiment of the invention;

FIG. 2B presents the floating point format used in the preferred embodiment of the invention;

FIG. 2C is a table demonstrating the two's complement normalized numerical format used in the invention;

FIG. 5 is a truth table for a decode circuit shown in FIG. 1;

FIG. 6 is a truth table for a compare circuit shown in FIG. 1;

DETAILED DESCRIPTION OF THE INVENTION

Figure 1:
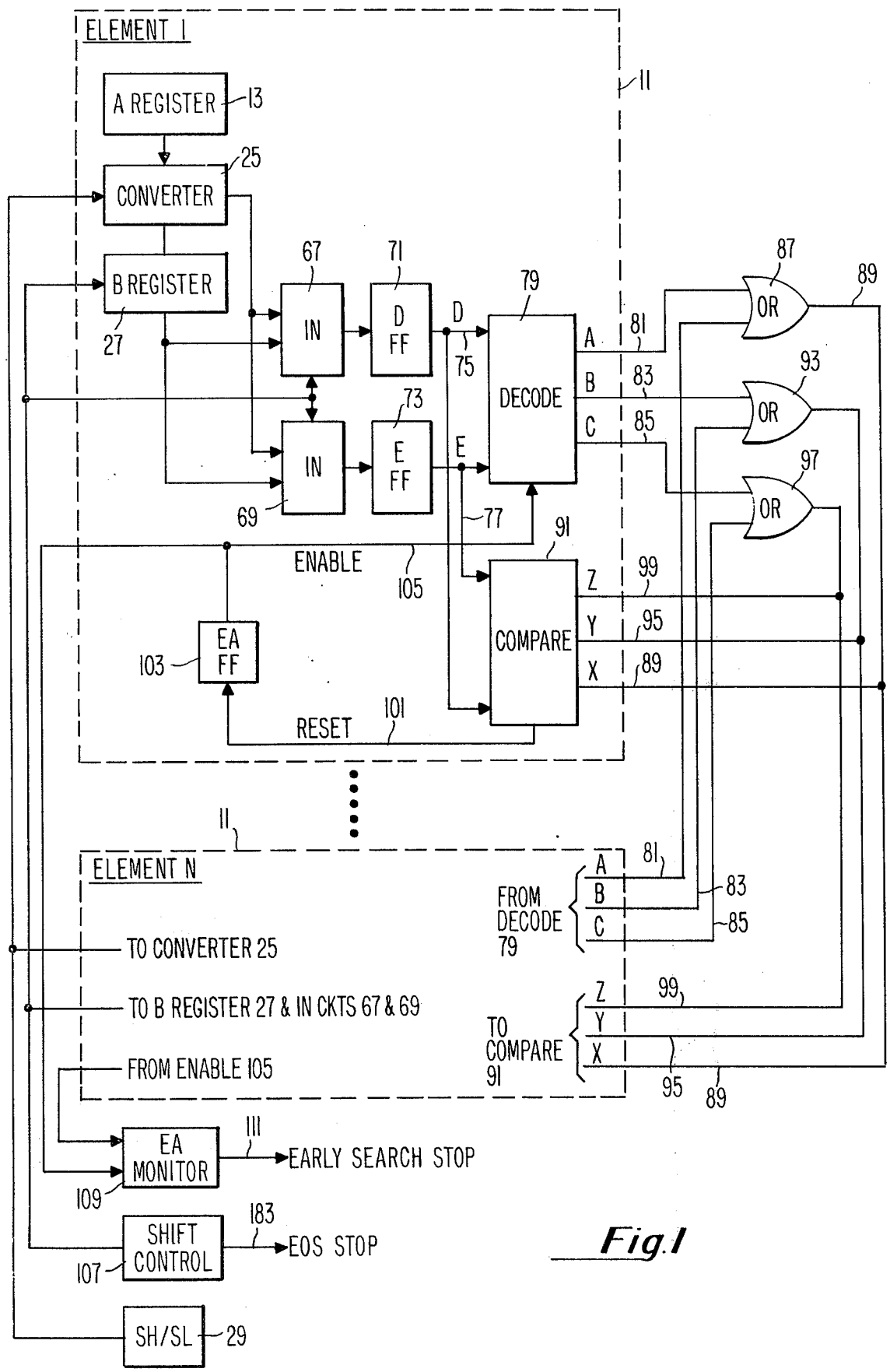
FIG. 1 is a functional block diagram showing the features of the present invention.

The select high/low register method and apparatus of the present invention resides in a large parallel processing environment having a plurality of processing elements, see FIG. 1. Each element 11 includes an A register 13 for storing numerical data in normalized floating point or integer formats. Routinely, the A registers 13 store numerical data temporarily before, during or after processing; i.e., multiplication, division, addition, subtraction, etc. Occassionally however, it becomes necessary to compare data in all the A registers 13 to determine which A register(s) 13 is storing either the highest or lowest value numerical data. In accord with the present invention the determination process involves two basic steps wherein the numerical data in each A register 13 is first converted into a pure binary pattern and thereafter all binary patterns are searched 2-bits-at-a-time to deterine which binary pattern(s) has selectively either the highest or the lowest relative value.

Each A register 13 stores two's complement numerical data which may be in either integer, see FIG. 2A, or normalized floating point, see FIG. 2B, format. In both integer and floating point format, a first bit 15, hereafter referred to as exponent sign bit 15, functions as the most significant bit when viewing the format as a pure binary number. The exponent sign bit 15 is always set to a logical zero in the integer format and signifies the sign of the exponent in floating point format with a logical zero signifying a positive exponent and a logical one signifying a negative exponent.

Immediately following the exponent sign bit 15 in both integer and floating point formats is a first field of bits hereinafter referred to as the exponent field 17. In integer format all bits in the exponent field 17 are set to logical zero. In floating point format the exponent field 17 represents the value of the exponent, see FIG. 2C. The exponent field 17 may comprise three bits as shown in FIG. 2C or more if required for the numerical calculation range of a specific application or computer system. An exponent field 17 comprising seven bits has been found to be satisfactory for a wide range of applications.

Following the exponent field 17 is integer/fraction sign bit 19 which represents the integer sign in integer format and fraction sign in floating point format. A logical zero integer/fraction sign bit 19 signifies a positive integer or fraction whereas a logical one integer/fraction sign bit 19 signifies a negative integer or fraction.

A second field of bits 21 hereinafter referred to as the integer/fraction field 21 follows the integer/fraction sign bit 19. The integer/fraction field 21 represents the integer value in integer format and the fraction value in floating point format. The integer/fraction field 21 may comprise three bits as shown in FIG. 2C or more if required for the numerical calculation range of a specific application or computer system. An integer/fraction field 21 comprising 23 bits has been found to be satisfactory for a wide range of applications.

The binary point 23 is considered to be following the integer/fraction field 21 in integer format and preceding the integer/fraction field 21 in floating point format.

As illustrated in FIG. 2C, the fraction portion of the floating point format is normalized. Thus, 0001 which represents a positive one-eighth value is not valid. If +one-eighth were thus permitted the eight bit representations 0010 0001 and 0000 0100 both would have the value of +one-half. To assure only one representation for each numerical value, the fraction is normalized as shown in FIG. 2C by forbidding (or declaring invalid) fractions having their most significant bit the same logical value as the integer/fraction sign bit 19. Likewise, to assure only one representation for the numerical value "zero", the floating point zero is defined as the number having its exponent sign bit 15 at logical one and all other bits at logical zero.

Referring again to FIG. 1, it is appreciated that the floating point or integer representation discussed above are temporarily stored in a plurality of A registers 13 during the normal course of computer computations. It matters not whether the numerical data is processed serially or in parallel into and out of the A registers 13. It is important that at a given period of time in the calculations a plurality of A registers 13 are storing either integer or floating point data and that it is desired to determine which A register(s) 13 is storing either the highest or lowest value data. Such determination begins with data conversion.

The numerical data in each A register 13 is fed in parallel through an associated converter 25 to an associated B register 27 which serves to store the converted numerical data. Each converter 25 operates under the control of a select high/select low control unit 29 which generates a logical 1 or a logic 0 depending on whether it is desired to search for the A register 13 storing the lowest or highest numerical data. Conversion differs for a high register search and a low register search.

To select the A register(s) 13 storing the highest value of numerical data four conversion steps are followed. First, the exponent sign bit 15 is complemented if the integer/fraction sign bit 19 is a logical zero. Second, the exponent field 17 is complemented if the integer/fraction sign bit 19 is a logical 1. Third, the integer/fraction field 21 remains unchanged. Finally, the integer/fraction sign bit 19 is complemented.

To select the A register(s) 13 storing the lowest value of numerical value another set of four conversion steps is followed. First, the exponent sign bit 15 is complemented if the integer/fraction sign bit 19 is at a logical 1. Second, the exponent field 17 is complemented if the integer/fraction sign bit 19 is at a logical 0. Third, the integer/fraction field 21 is complemented. Finally, the integer/fraction sign bit 19 remains unchanged. The functions of converter 25 are implemented using standard "off-the-shelf" hardware, see FIG. 3. All bits of the integer/fraction field 21 and the integer/fraction sign bit 19 are fed from the A register 13 to an integer/fraction complement circuit 31 controlled by the select high/select low control unit 29. A logical zero from the select high/select low control unit 29 to the control input 33 of the integer/fraction complement circuit 31 will permit all bits to pass therethrough unchanged to the appropriate converted integer/fraction field 37 and integer/fraction sign bit 35 portions of the B register 27. Conversely, a logical one from the select high/select low control unit 29 will cause all bits to be complemented before passing to the B register 27.

The simple function of the integer/fraction complement circuit 31 may be physically realized in many different ways well known to those skilled in the logic design art. As an example, many off-the-shelf adders available today also perform subtraction by complementing one input. Thus, if one input is held at logical zero, the other may be added to it or effectively passed through the adder unchanged. Likewise, with one input at zero, the subtraction function will serve to complement the other input. In a working model of the invention, a satisfactory integer/fraction complement circuit 31 has been fabricated using the arithmetic logic unit/function generator MC10181 available as a standard item from Motorola, Inc. The MC10181 is only a 4 bit unit and therefore parallel operation of two or more is required to handle integer/fraction fields 21 containing more than 3 bits.

The converted integer/fraction sign bit output 36 of the integer/fraction complement circuit 31 is logically inverted by a standard logic inverter 38 to produce an inverter output 39 which is the complement of the integer/fraction sign bit 19 when the integer/fraction field 21 is not complemented and which is logically equal to the integer/fraction sign bit 19 otherwise.

The exponent sign bit 15 of the A register 13 is applied to a first input 41 of an exclusive OR circuit 43. The second input 45 of the exclusive OR circuit 43 is fed to the output of an inverter 47 which complements the integer/fraction sign bit 19 stored in A register 13. The output 49 of the exclusive OR circuit 43 is fed through an exponent complement circuit 51 and is outputted therefrom on data line 53 and stored as the converted exponent sign bit 55 in the B register 27.

The exponent complement circuit 51 operates under the control of the select high/select low control circuit 29 to either pass bits through unchanged or to complement same. As such the exponent complement circuit 51 is identical to the integer/fraction complement circuit 31 and may be physically realized as above described.

The exponent complement circuit 51 also serves to control the complementing of the exponent field 17 stored in A register 13. To this end, all bits of the exponent field 17 are fed through data path 56 to an exclusive OR system 57. Another input 59 is provided to the exclusive OR system 57 from the integer/fraction sign bit 19 stored in A register 13. The exclusive OR system 57 functions as a plurality of exclusive OR circuits, one for each bit in the exponent field 17 and may be fabricated as a plurality of standard exclusive OR circuits. The output 60 of the exclusive OR system 57 is fed through the exponent complement circuit 51 into the converted exponent field 61 of B register 27.

As noted, the select high/select low control circuit 29 merely serves to generate a logical 1 or a logical 0 depending on whether a search for the high register(s) or low register(s) is desired. As such, the control circuit 29 represents no more than a flip-flop output whose inputs are generated by decision logic within the computer environment in which the present invention is embodied.

Figure 3:
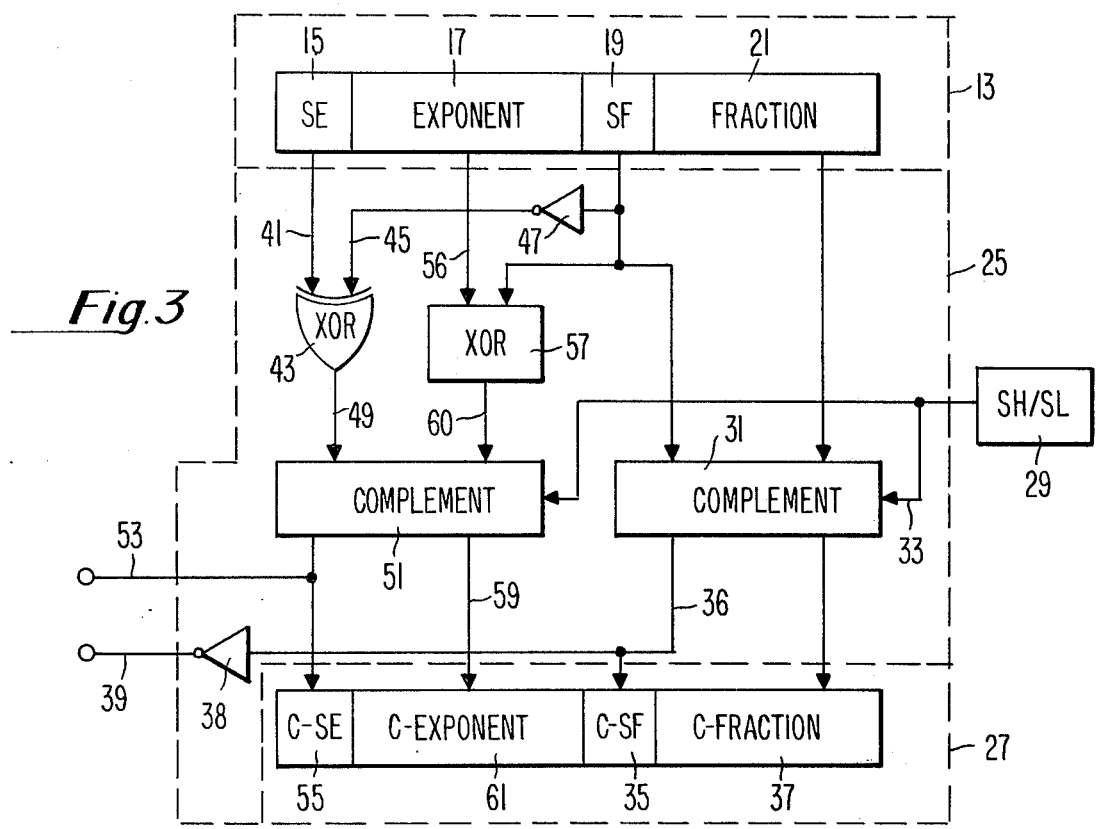
FIG. 3 is a logic diagram of a comparator shown in FIG. 1.
Figure 4:
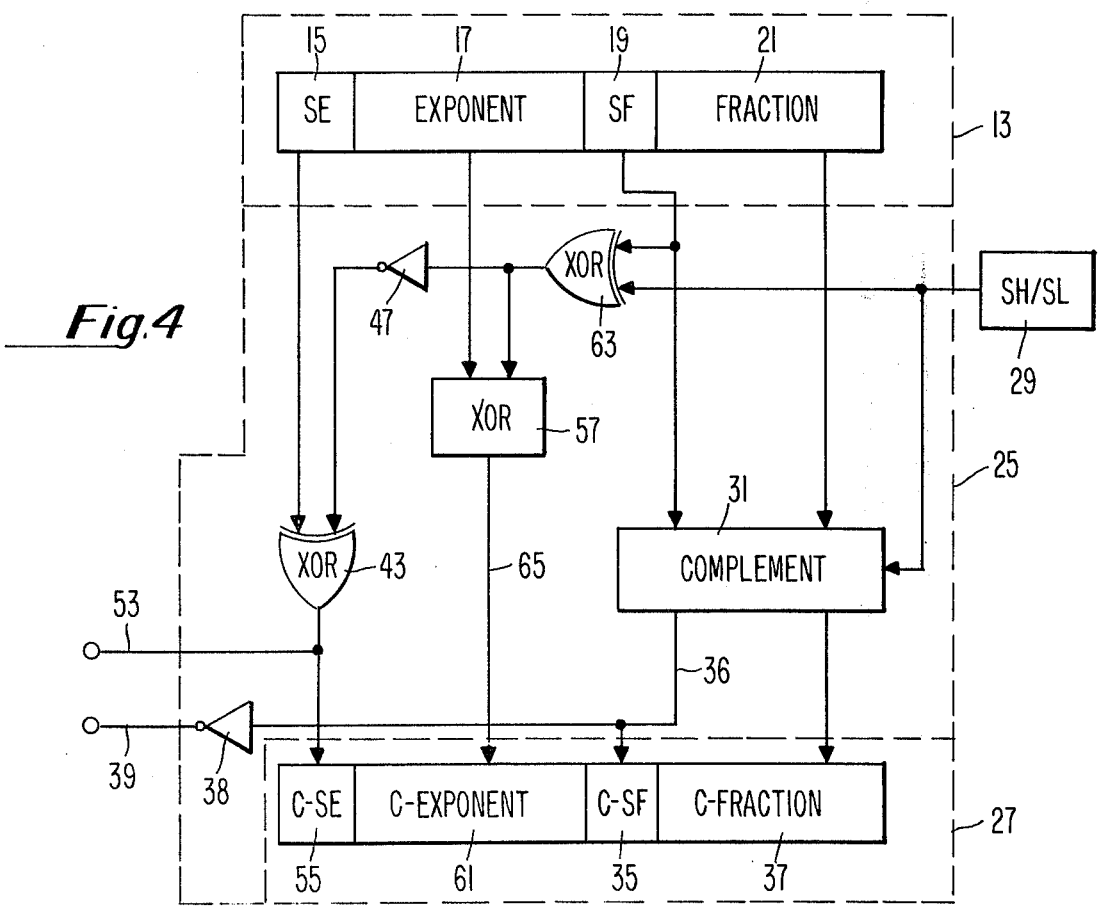
FIG. 4 is an alternate logic diagram for the comparator of FIG. 3.

FIG. 4 represents an alternative approach to the realization of the converter 25. As compared to the converter 25 realization of FIG. 3, it is seen that the integer/fraction portions remain the same and that the differences involve the substitution of an exclusive OR circuit 63 for the exponent complement circuit 51 and the slight rewiring necessitated by the substitution. The exclusive OR 63 is inputted by the integer/fraction sign bit 19 and the select high/select low control circuit 29. The exclusive OR circuit 63 drives the inverter 47 and the exclusive OR system 57. The output 60 of the exclusive OR system 57 provides directly the converted exponent field 61. Following conversion, the process of searching for the high or low register commences, see again FIG. 1. As will be discussed in greater detail hereinafter, the converted data in B register 27 is shifted 2 bits at a time into a first and second input select circuit 67 and 69, respectively. Generally, the input circuits 67 and 69 merely pass bits from the B register 27 to the D flip-flop 71 and the E flip-flop 73, respectively. However, as will be discussed later, at the first step of a search cycle, 2 bits are passed from the converter 25, 1 bit to the D flip-flop 71 and the other bit to the E flip-flop 73.

The D output 75 of D flip-flop 71 and E output 77 of E flip-flop 73 are inputted to a decode circuit 79 having an A output 81, a B output 83, and a C output 85. FIG. 5 illustrates in truth table fashion the function of the decode circuit 79. It can be seen that the decode circuit 79 provides basically a binary to 1-in-3 conversion.

The A output 81 of decode circuit 79 feeds an OR circuit 87. As shown, the OR circuit 87 is fed by all A outputs 81, one for each element 11 involved in the high/low register search. The output of OR circuit 87 is fed as the X input 89 of a compare circuit 91. As shown, there is one compare circuit 91 for each element 11 involved in the search.

Likewise, the B output of decode circuit 79 feeds an OR circuit 93. The output of OR circuit 93 is fed as the Y input 95 of the compare circuit 91. Finally, the C output 85 of the decode circuit 79 feeds an OR circuit 97. The output of OR circuit 97 is fed as the Z input 99 of the compare circuit 91.

The function of the compare circuit 91 is illustrated in truth table fashion in FIG. 6. As shown, the compare circuit 91 outputs a logical 0 on a reset line 101 (see FIG. 1) when the associated D output 75 and E output 77 represent a binary number equal to or greater than any other D output 75 and E output 77 generated by the other elements 11 involved in the high/low register search.

A logical one on reset line 101 resets an element active flip-flop 103 which in turn generates a logical level on line 105, which as will be detailed hereinafter, effectively removes the associated element 11 from the high/low search.

The above procedure of examining data in the B registers 27 2 bits at a time is continued under the control of shift control unit 107. Shift control unit 107 shifts bits out of the B register 27 two bits at a time from the most significant to the least significant bits. The shifting procedure is continued until all bits have been shifted out of the B register 27 and have been processed through the decode circuit 79, the OR circuits 87, 93 and 97, and the compare circuit 91. After all bits have been shifted through the B register 27 only those elements 11 having A registers 13 storing selectively either the highest or lowest value data remain active as indicated by the element activity flip-flop 103.

The search procedure may be concluded early if only one element activity flip-flop 103 remains active at any point during the search. The element activity flip-flops 103 are monitored by element activity monitor 109. Element activity monitor 109 monitors all element activity flip-flops 103 and generates an early search stop signal 111 when one and only one element activity flip-flop remains active. The element activity monitor 109 may be fabricated from a counter which is decreased one count each time element activity flip-flop 103 indicates that its associated element 11 is no longer active and increased one count each time a new element activity flip-flop 103 indicates that an element 11 has become active. Alternative methods of physically realizing the element activity monitor 109 may also be used. For example, the element activity monitor 109 may be fabricated as an exclusive OR circuit which functions to generate the early search/stop signal when one and only one element activity flip-flop 103 remains active. The above description briefly outlines the search procedure of the present invention. A more detailed description of the search procedure and hardware involved follows.

Figure 7:
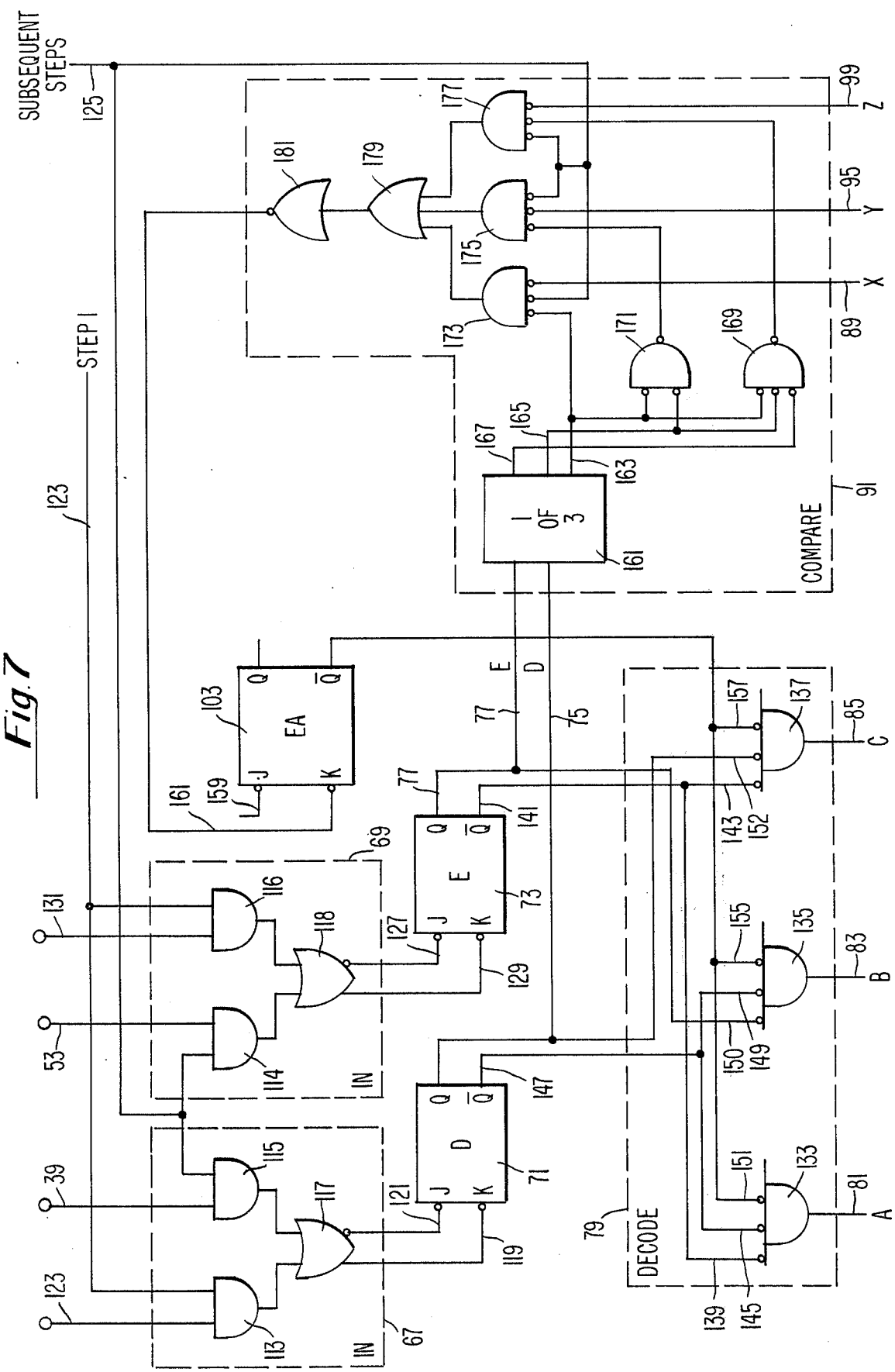
FIG. 7 is a logic diagram of the decode and compare circuits shown in FIG. 1 and functionally described in the truth tables of FIG. 5 and FIG. 6.

FIG. 7 details schematically the search logic shown generally in FIG. 1. With continued reference to FIG. 7, input circuit 67 comprises a first two-input to AND gate 113 and a second two-input AND gate 115 both of which feed an OR circuit 117. The direct output of the OR circuit feeds the K input 119 of the D flip-flop 71 while the inverted output of the OR circuit 117 feeds the J input 121 of D flip-flop 71.

The first AND circuit 113 is fed by data line 122 which supplies the most significant bit remaining in the B register 27 starting with the bit in the converted exponent field 61 adjacent to the converted exponent sign bit 55. The first AND circuit 113 is also inputted by a data line 123 supplied from the shift control unit 107 which indicates by a logical 1 the first step of a search procedure. In other words, a logical one is present on data line 123 during the examination of the first 2 bits in a search procedure. The second AND circuit 115 is fed by data line 39 conveying the output of inverter 37 which supplies the complement of the converted integer/fraction sign bit 36. The second AND circuit 115 is also inputted by a data line 123 supplied from the shift control unit 107, the data line 123 being held at logical 0 for the first step of a search procedure and at a logical one level for all subsequent steps.

As can be seen in FIG. 3 and FIG. 4, two outputs, one on data line 52 and one on data line 39 are provided from the converter 25. These data lines enable to search procedure to begin while the bulk of the data is being shifted into the B register 27 thereby giving a headstart to the search procedure. Also, it is noted that the search procedure begins with an examination of the converted representation sign bits 15 and 19. Thereafter, as will be detailed herein, the search procedure continues 2 bits at a time from the most significant bits down to the least significant bits of the B register 27.

The input circuit 69 is internally identical to input circuit 67 and comprises a first AND circuit 114 and a second AND circuit 116 both of which feed an OR circuit 118. The direct output of OR circuit 118 drives the K input 127 of E flip-flop 73 and the inverted output of OR circuit 118 drives the J input 129 of E flip-flop 73. The first AND circuit 114 is fed by data line 53 from converter 25. As will be remembered, data line 53 provides the converted representation of the exponent sign bit 15. The AND circuit 114 is also inputted by data line 125 which provides a logical one for all steps of the search procedure following step one. The AND circuit 116 is inputted by data line 131 which serves to convey the second most significant remaining bit of the B register 27. Thus, input circuit 69 serves to convey to the E flip-flop 73 the converted representation of the exponent sign bit 15 during the first step of the search procedure and the second most significant bit remaining in the B register 27 during the subsequent steps of the search procedure.

The input circuits 67 and 69 may be fabricated from standard logic packages. For example, the dual "OR-AND/OR-AND-INVERT" gate MC10117 available from Motorola, Inc., may be used. If the MC10117 is employed, the OR circuit 117 input circuit 67 and the OR circuit 118 of input circuit 69 are realized as "wired ORs". Likewise, the D flip-flop 71 and the E flip-flops 73 may also be realized as standard flip-flop items such as the MC10135 flip-flop package available from Motorola. The D flip-flop 71 and the E flip-flop 73 may be reset prior to the beginning of a search procedure or subsequent to the end of a search procedure as desired for a particular application.

The D flip-flop 71 and E flip-flop 73 drive the decode circuit 79. The decode circuit 79 comprises three inverted AND input AND circuits 133, 135, and 137. The decode circuit 79 may be fabricated from standard logic packages such as the MC10109 "OR/NOR" gate available from Motorola. A first input 139 of AND gate 133 is driven by the $\overline{Q}$ output 141 of E flip-flop 73. The $\overline{Q}$ output 141 also drives a first input 143 of AND gate 137. A second input 145 of AND gate 133 is driven by the $\overline{Q}$ output 147 of D flip-flop 71. The $\overline{Q}$ output 147 also drives the second input 149 of AND gate 135. The third input 151 of AND gate 133 is driven by the $\overline{Q}$ output 153 of element active flip-flop 103. The $\overline{Q}$ output 153 also drives the third inputs 155 of AND gate 135 and 157 of AND gate 137.

The first input 150 of AND gate 135 is driven by the Q output herebefore identified as the E output 77 of the E flip-flop 73. The second input 152 of the AND gate 137 is driven by the Q output herebefore identified as the D output 75 of D flip-flop 71.

Wired as such, the decode circuit 79 performs the functions illustrated in table fashion in FIG. 6. In addition, it is noted that the element active flip-flop 103 effectively controls all outputs 81, 83, and 85 of the decode circuit 79 by its ability to force all outputs to zero and thereby removing the element 11 involved from the search. When it is desired for a given element 11 to be active or involved in the search procedure, a signal is applied to the J input 159 of the element active flip-flop 103 which thereby enables the decode circuit 79 to respond to the D flip-flop 71 and the E flip-flop 73.

When a logical one signal is applied to the K input 161 of element active flip-flop 103 a signal is generated on the $\overline{Q}$ output 153 which blocks the AND gates 131, 135, and 137 thereby effectively removing the associated element 11 from the search procedure. A logical 1 signal appears on the K input 161 when the two bits under examination for the associated element 11 are less in value than the correlating two bits from another element 11 involved in the search procedure.

The A output 81, the B output 83, and the C output 85 are ORed as shown in FIG. 1 and as above described and the ORing thereof generates the X input 87, the Y input 93, and the Z input 97, respectively, as shown in FIG. 1. Returning now to FIg. 7, the details of the compare circuit 91 will be described. An encoding of E output 77 and D output 75 is accomplished through a one-of-three circuit 161 which performs the function illustrated in the truth table of FIG. 5, wherein the A levels shown in FIG. 5 correspond to output 163, the B levels correspond to output 165 and the C levels correspond to output 167. The one-of-three circuit 161 may be fabricated from a standard off-the-shelf item such as the Motorola MC 10162 package. Alternatively, the function could be realized by the implementation described for the decode circuit 79 given above. Outputs 163, 165, drive a first inverted input gate 169 while outputs 163 and 165 drive a second inverted input gate 171. The gates 169 and 171 may be fabricated from the Motorola MC 10109 dual OR-NOR gate package.

The compare circuit 91 also contains three inverse inputted AND circuits 173, 175, and 177. The output of the three inverse inputted AND circuits 173, 175, and 177 drive an OR circuit 179. The gates 173, 175, 177, and 179 are standard logic packages and may all be configured from a Motorola MC10121 unit with the OR circuit 179 being realized as a wired-OR. Gate 173 is driven by the 163 output of one-of-three circuit 161 and by the X output 89 and by the data line 125 which is at a logical 1 for all steps in the search procedure except step one. Gate 175 is driven by gate 171, Y output 95, and by data line 125. Gate 177 is driven by data line 125, gate 169, and the Z output 99. The OR gate 179 drives a NOR gate 181 which, in turn, generates a signal for the K input 161 of element active flip-flop 103.

Returning to FIG. 1, it is seen that the shift control unit 107 shifts data out of the B register 27 through input circuits 67 and 69 into the D flip-flop 71 and the E flip-flop 73 for further decoding and comparing. As stated above, the first 2 bits to be decoded and compared are the converted representations of the exponent sign bit 15 and the integer/fraction sign bit 19 provided from the converter 25. Thereafter, bits are shifted, 2 bits at a time, from the most significant bits to the least significant bits from the B register 27 through the input circuits 67 and 69 to the D flip-flop 71 and the E flip-flop 73 for decoding and comparing. After all of the bits have been shifted through the B register 27 the shift control unit sends out on line 183 a signal indicating that all bits have been so shifted and that the search is over. At this point only the elements 11 containing selectively the highest or lowest A registers 13 remain active as indicated by the element active flip-flop 103. Thus the search is over.

Figure 8:
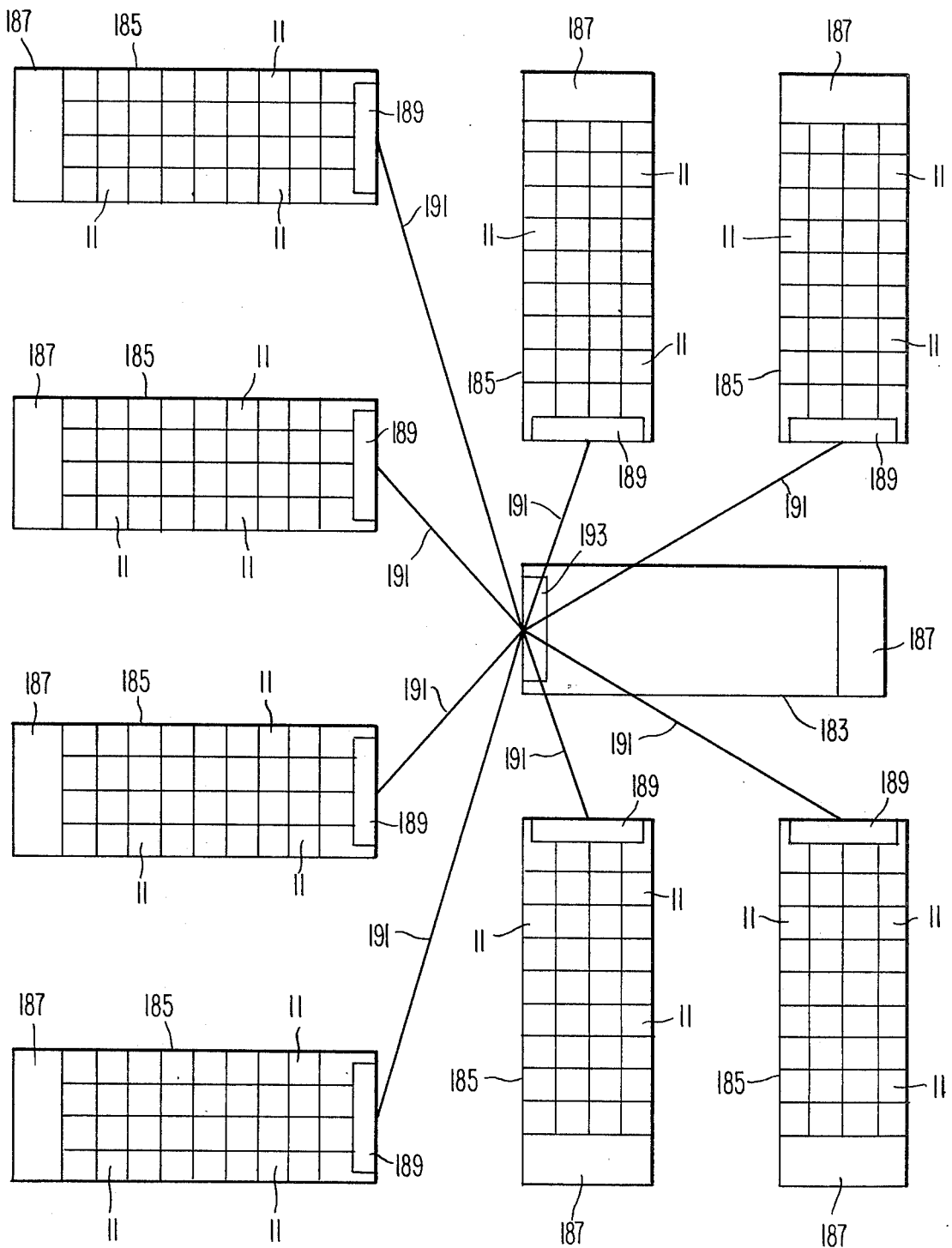
FIG. 8 is a block diagram of a large parallel processor utilizing the present invention.

FIG. 8 illustrates the physical layout of the type of large parallel processing environment in which the present invention has particular application. The processing environment shown therein includes a central control console 183 and eight processing bays 185. The central control console 183 and each processing bay 185 is powered by its own power supply system 187.

Each processing bay 185 includes 36 processing elements 11 arranged in a four row by nine column matrix as shown. Each element 11 communicates with the central control console 183 through a bay signal distribution unit 189, a data path 191, and the console signal distribution unit 193.

Since each data path 191 is on the order of 10 feet in length, it can be appreciated that propagation delays are significant and that the present invention reducing such delays finds great applicability in such a system. Furthermore, it can be appreciated that due to the large number of elements 11 involved, the three OR circuits 87, 93, and 97 shown in FIG. 1, need to be replaced physically but not functionally by a more sophisticated ORing system such as shown in FIG. 9.

Figure 9:
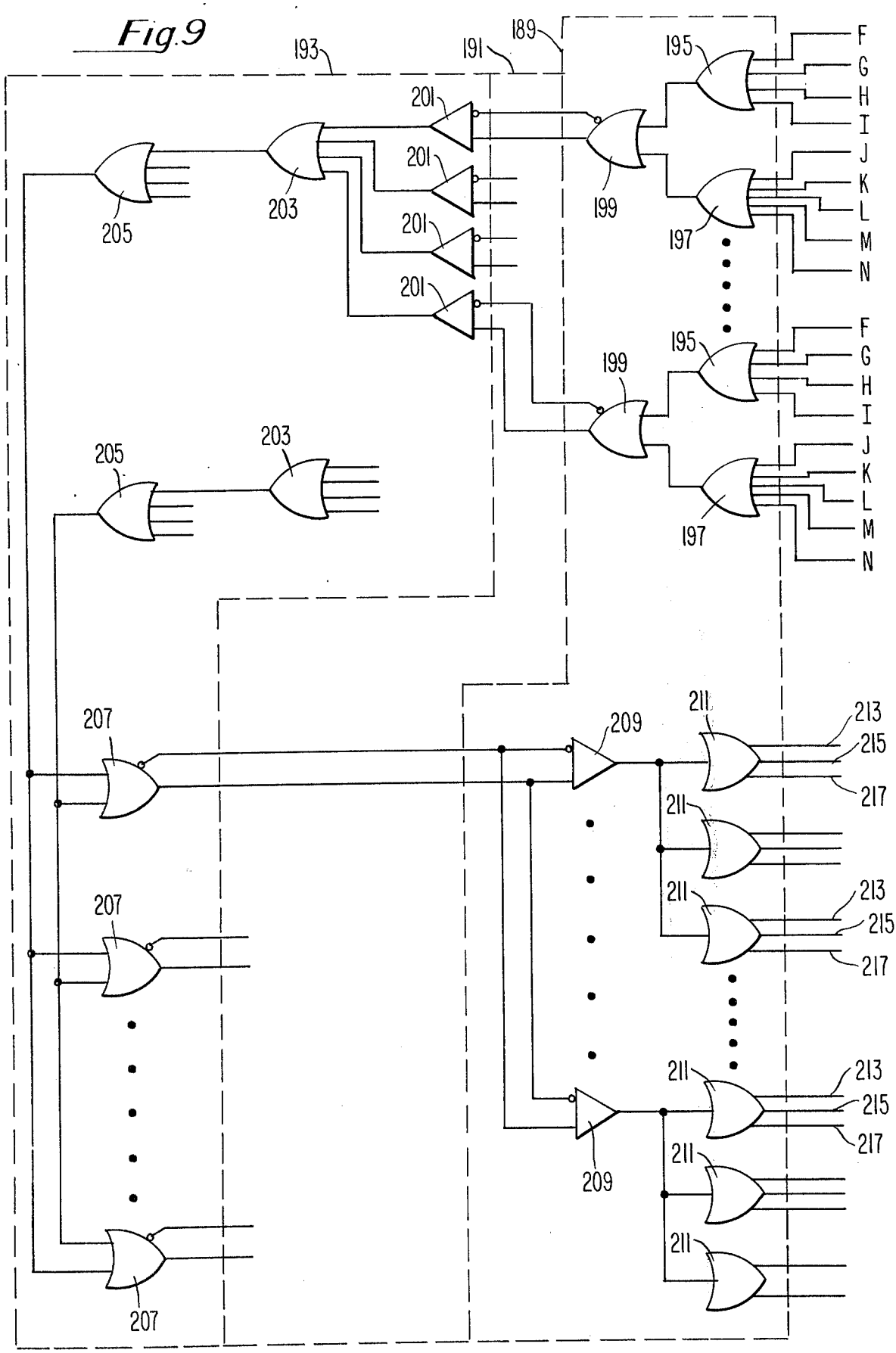
FIG. 9 is a logic diagram of an ORing system used to adapt an OR circuit shown in FIG. 1 to the large parallel processor of FIG. 8.

With reference to FIG. 9 each bay signal distribution unit 189 includes a pair of OR circuits 195 and 197 driving a line driver 199. The OR pair 195 and 197 has nine inputs labeled letter F through the letter N. The combination of the OR pair 195 and 197 and the line driver 199 is repeated four times over to provide an overall ORing capability of 36 inputs. It is noted that each OR pair 195 and 197 and driver 199 combines the nine inputs, one input from each element 11 in a column in the processing bay 185 and that there are four OR pairs 195 and 197 and line driver 199, one for each row of elements 11 in the processing bay 185. Motorola MC10109 gates may be used for OR circuit 195 and 197 and Motorola gate MC10105 may be used for line driver 199. It is appreciated that the above described network of OR pairs 195 and 197 and line driver 199 serve to OR together only one output such as the A output 81 from each element 11. The ORing network above described need be repeated for the B output 83 and for the C output 85. Since the logic and wiring systems required for the A outputs 81, B outputs 83, and C outputs 85 are identical, only one such logic network will be described as shown in FIG. 9.

The outputs of the line drivers 199 pass through the data path 191 to the console signal distribution unit 193 where they are received by a quad set of line receivers 201 which may be implemented by a Motorola quad line receiver MC10115. The output of the line receivers 201 are combined in a first four-input OR circuit 203 driving a second four-input OR circuit 205. The combination of the four-input OR circuits 203 and 205 drive a network of eight parallel OR gates 207. Each OR gate 207 ORs together an output from each element 11. As an example, each OR circuit 207 ORs together the A output 81 from all elements 11. It is appreciated then that the logic network thus described and shown in FIG. 9 is repeated for the B outputs 83 and the C outputs 85. Each OR circuit 207 drives through a data path 91 to a bay signal distribution unit 189. Each OR circuit 207 drives a single processing bay 185.

In each bay signal distribution unit 189 of each processing bay 185 a quad set of line receivers 209 receive the outputs of a given OR circuit 207. Each line receiver 209 drives three drivers 211, each driver 211 having three outputs 213, 215, and 217 thus providing nine outputs for each line receiver 209 and since there are four line receivers 209 in each bay 185, 36 outputs are provided, one for each processing element 11. The Motorola unit MC10115 may be used for the line receiver 209 and Motorola unit MC10210 may be used for the drivers 211.

The logic systems of FIG. 8 and FIG. 9 may be powered by the various power supply systems 187 in a manner such that a failure of a portion of a supply system need result in failure to only a given row of nine elements 11. As such, the parallel processing system may be considered fail-soft in that a failure of a given portion of power supply results in a disabling of only one-quarter of the processing bay 185.

It is appreciated that other system configurations may be envisioned and implemented which are not beyond the scope of this invention. For example, in the embodiment of the invention described above, data is shifted out of the B register 27 whereas in an alternate embodiment a mask vector two bits wide may be used as is well known in the art to present to the input circuits 67 and 69 2 bits of data at a time from the B register 27 from the most significant bits down to the least significant bits. Also, the principles illustrated in the above embodiment of the invention may be extended to a high/low register search wherein 3 bits are examined at a time or 4 bits or 5 bits, etc. Although the present invention has been described with a certain degree of particularity, it should be understood that the present disclosure has been made by way of example and that changes in the combination and arrangement of parts obvious to one skilled in the art, may be resorted to without departing from the scope and spirit of the invention.

What is claimed is:

1. An apparatus for selecting certain logic elements in a plurality of logic elements, said apparatus including:
a plurality of logic elements;
means for activating individual logic elements in said plurality of logic elements;
a first register in each logic element of said plurality of logic elements, each said first register for storing a numerical value;
converter means associated with each said first register and inputted therefrom, each said converter means for converting said numerical value stored in said first register associated therewith into a pure binary number;
a second register associated with each said converter means inputted therefrom, each said second register for storing said pure binary number of said converter means associated therewith;
means controlling each said second register for repetitively shifting out therefrom at least 2 bits at a time said pure binary stored therein sequentially from the most significant bit to the least significant bit;
means responding to each shifting by said repetitively shifting means for comparing said at least 2 bits shifted out of said second register of each active logic element in said plurality of logic elements with all other said at least 2 bits so shifted out of all other active logic elements in said plurality of logic elements, and for deactivating all active logic elements in said plurality of logic elements having said at least 2 bits shifted out thereof of lower value than said at least two bits shifted out of any other active logic element in said plurality of logic elements; and
means monitoring said repetitively shifting means for indicating when all bits of said pure binary number have been shifted out of each said second register and compared by said means for comparing and deactivating whereby all logic elements in said plurality of logic elements remaining active after said indicating are indicated as being selected.

2. The apparatus according to claim 1 wherein each said numerical value stored in each said first register comprises an exponent sign bit, a digital exponent field, an integer/fraction sign bit, and a digital integer/fraction field, and wherein each said converter means includes:
controller means having a first and a second logical state for controlling conversion of said numerical digital value stored;
means for complementing said exponent sign bit when both said integer/fraction sign bit equals a logical zero and said controller means is in said first logical state and when both said integer/fraction sign bit equals a logical one and said controller means is in said second logical state;
means for complementing said exponent field when both said integer/fraction sign bit equals a logical 1 and said controller means is in said first logical state and when both said integer/fraction sign bit equals a logical 0 and said controller means is in said second logical state;
means for complementing said integer/fraction field when said controller means is in said second logical state; and
means for complementing said integer/fraction bit when said controller means is in said first logical state.

3. The apparatus according to claim 1 wherein said pure binary number stored in said second register of each logic element in said plurality of logic elements is of the same relative order with respect to each said pure binary number stored in each other said second register as said numerical value stored in said first register of the same logic element is with respect to each other said numerical value stored in each other said first register.

4. The apparatus according to claim 3 wherein said numerical value stored in each said first register comprises an exponent sign bit, a digital exponent field, an integer/fraction sign bit, and a digital integer/fraction field, and wherein each said converter means includes:
means for complementing said exponent sign bit when said integer/fraction sign bit equals a logical ;
means for complementing said exponent field when said integer/fraction sign bit equals a logical 1; and
means for complementing said integer/fractions bit.

5. The apparatus according to claim 1 wherein said pure binary number stored in said second register of each logic element in said plurality of logic elements is of the inverse relative order with respect to each other said pure binary number stored in each other said second register as said numerical value stored in said first register of the same logic element is with respect to each other said numerical value stored in each other said first register.

6. The apparatus according to claim 5 wherein said numerical value stored in each said first register comprises an exponent sign bit, a digital exponent field, an integer/fraction sign bit, and a digital integer/fraction field; and wherein each said converter means includes:
means for complementing said exponent sign bit when said integer/fraction sign bit equals a logical one;
means for complementing said exponent field when said integer/fraction sign bit equals a logical zero; and
means for complementing said integer/fraction field.

7. A method of selecting certain logic elements in a plurality of logic elements, said method comprising the steps of:
activating individual logic elements in the plurality of logic elements;
storing in each said activated logic element a numerical value associated therewith;
converting in each said activated logic element said associated numerical value stored therein into a pure binary number;
storing in each said activated logic element said pure binary number converted therein;
repetitively comparing all said stored pure binary numbers at least two bits at a time from the most significant bits to the least significant bits; and
deactivating in response to said step of comparing each said activated logic element in the plurality of logic elements having said pure binary number stored therein of lower value than said pure binary number stored in any other said activated element whereby all logic elements in the plurality of logic elements remaining active after said step of deactivating are indicated as being selected.

8. An apparatus for selecting certain logic elements in a plurality of logic elements comprising:
means for activating individual logic elements in the plurality of logic elements;
means for storing in each said activated logic element a numerical value associated therewith;
means for converting in each said activated logic element said associated numerical value stored therein into a pure binary number;
means for storing in each said activated logic element said pure binary number converted therein;
means for repetitively comparing all said stored pure binary numbers at least 2 bits at a time from the most significant bits to the least significant bits; and
means for deactivating in response to said step of comparing each said activated logic element in the plurality of logic elements having said pure binary number stored therein of lower value than said pure binary number stored in any other said activated element whereby all logic elements in the plurality of logic elements remaining active after said step of deactivating are indicated as being selected.

9. The apparatus according to claim 8 wherein said means for storing a numerical value includes a first register and said means for storing said pure binary number includes a second register.

10. The apparatus according to claim 8 wherein said numerical value comprises an exponent sign bit, an exponent field, an integer/fraction sign bit, and an integer/fraction field, and wherein said means for converting includes means for complementing said exponent sign bit when said integer/fraction sign bit equals a logical 0;
means for complementing said exponent field when integer/fraction sign bit equals to logical 1; and
means for complementing said integer/fraction bit.

11. The apparatus according to claim 8 wherein said numerical value comprises an exponent sign bit, an exponent field, an integer/fraction sign bit, and an integer/fraction field; and wherein each said means for converting includes:
means for complementing said exponent sign bit when said integer/fraction sign bit equals a logical 1;
means for complementing said exponent field when said integer/fraction sign bit equals a logical 0; and
means for complementing said integer/fraction field.

* * * * *